United States Patent

Rosendahl et al.

Patent Number: 6,044,319
Date of Patent: *Mar. 28, 2000

[54] PROCESS FOR ATTENUATING THE YAWING MOMENT IN A VEHICLE WITH AN ANTI-LOCK BRAKE SYSTEM (ABS)

[75] Inventors: Hartmut Rosendahl, Hannover; Johann Rothen, deceased, late of Sarstedt, by Margarethe Rothen, legal representative; Ralf Koschorek, Hannover, all of Germany

[73] Assignee: WABCO GmbH, Hannover, Germany

[*] Notice: This patent is subject to a terminal disclaimer.

[21] Appl. No.: 08/854,289

[22] Filed: May 9, 1997

[30] Foreign Application Priority Data

May 14, 1996 [DE] Germany .............................. 196 19 381

[51] Int. Cl.⁷ .............................. G06F 7/00; G06F 17/00
[52] U.S. Cl. .............................. 701/71; 701/70; 701/78; 701/83; 303/146; 303/149; 303/186
[58] Field of Search .............................. 701/70, 71, 73, 701/78, 80, 81, 83; 303/146, 140, 148, 149, 150, 186, 188, 189

[56] References Cited

U.S. PATENT DOCUMENTS

| | | | |
|---|---|---|---|
| 3,988,043 | 10/1976 | Reinecke | 303/21 |
| 4,349,876 | 9/1982 | Lindemann | 701/73 |
| 4,998,593 | 3/1991 | Karnopp et al. | 701/41 |
| 5,230,550 | 7/1993 | Braschel et al. | 701/78 |
| 5,368,373 | 11/1994 | Braschel et al. | 701/78 |
| 5,407,258 | 4/1995 | Giers et al. | 303/147 |
| 5,452,947 | 9/1995 | Ehmer et al. | 701/79 |
| 5,520,448 | 5/1996 | Okubo | 303/148 |

FOREIGN PATENT DOCUMENTS

| | | |
|---|---|---|
| WO 92/19478 | 11/1992 | European Pat. Off. . |
| 24 60 309 A1 | 6/1976 | Germany . |
| 36 26 753 A1 | 2/1988 | Germany . |
| 28 55 326 C2 | 11/1989 | Germany . |
| 39 19 347 C2 | 2/1990 | Germany . |
| 38 40 564 A1 | 3/1990 | Germany . |
| 38 38 536 A1 | 5/1990 | Germany . |
| 39 25 828 A1 | 2/1991 | Germany . |
| 40 12 168 C2 | 10/1991 | Germany . |
| 41 14 734 A1 | 11/1992 | Germany . |
| 42 25 983 A1 | 2/1994 | Germany . |
| 44 40 049 A1 | 5/1995 | Germany . |
| 44 06 235 A1 | 8/1995 | Germany . |

Primary Examiner—William A. Cuchlinski, Jr.
Assistant Examiner—Gertrude Arthur
Attorney, Agent, or Firm—Proskauer Rose LLP

[57] ABSTRACT

A process for reducing yaw during braking in a vehicle having an anti-lock braking system (ABS) and traveling on a roadway having different coefficients of friction on opposite sides of the vehicle comprises regulating the braking pressures in the wheels of the vehicle during ABS-controlled braking so that a permissible braking pressure difference ($\Delta P$) between the braking pressures in the high and low wheels is maintained. The permissible braking pressure difference ($\Delta P$) is calculated by an electronic system based on an algorithm that takes into account the frictional value of the road, and/or the load on the vehicle, and/or the wheel base of the vehicle, and/or the wheel gauge of the vehicle, and/or the level of the center-of-gravity of the vehicle. The algorithm increases the value of the permissible braking pressure difference ($\Delta P$) as the frictional value of the road, the load of the vehicle, and the wheel base of the vehicle increase. The algorithm decreases the value of the permissible braking pressure difference ($\Delta P$) as the level of the center-of-gravity of the vehicle and the wheel gauge of the vehicle increase.

7 Claims, 1 Drawing Sheet

PROCESS FOR ATTENUATING THE YAWING MOMENT IN A VEHICLE WITH AN ANTI-LOCK BRAKE SYSTEM (ABS)

BACKGROUND OF THE INVENTION

The present invention relates to a process for attenuating the yawing moment in a vehicle having an anti-lock brake system (ABS). The present invention is related to the invention disclosed in commonly assigned patent co-pending application Ser. No. 08/756,593, filed Nov. 27, 1996.

When a vehicle is braked on a roadway with different frictional values on the two sides of the vehicle ($\mu$ split), the vehicle will tend to pull towards the side of the roadway with the higher frictional value. The driver must counter the yawing moment which causes this tendency to pull by steering against it. This may be a problem for an inexperienced driver, especially if the yawing moment is especially strong due to unfavorable conditions. Unfavorable conditions which exaggerate the yawing moment during braking include a short wheel base, a small load, especially great differences in road condition such as, e.g., concrete on one side of the roadway and ice on the other, and especially strong braking action such as occurs with a regulating anti-lock brake system (ABS).

In vehicles equipped with an anti-lock brake system (ABS), it is already known from DE-OS 28 55 326 (U.S. Pat. No. 4,349,876) to attenuate the yawing moment produced when braking takes place on a road with different surfaces on the right and left sides of the vehicle ($\mu$ split) by building up the braking pressure in the wheel running with the higher coefficient of friction (high wheel) with a predetermined time delay, and then to limit the braking pressure to a constant value, thereby increasing the stability of the vehicle and relieving the driver of the need to counter the yawing moment. This takes place thanks to special measures taken within the electronic system of the anti-lock brake system (ABS).

Lately, vehicles equipped with so-called electrically controlled braking systems (EBS) have also become known. In such braking systems, e.g., the braking system described in DE-OS 44 06 235, the braking pressure (actual value) in a brake cylinder is adjusted to a desired braking value generated by a braking force transmitter. Normally, these EBS braking systems are also equipped with an anti-lock brake system (ABS). Since pressure sensors are utilized in an electrically controlled braking system (EBS), it is already known to limit the braking pressure difference ($\Delta P$) between the "low wheel" (wheel on side of road with low coefficient of friction) and the "high wheel" (wheel on side of the road with high coefficient of friction), and thereby reduce the yawing moment. See, e.g., DE-OS 24 60 309 (U.S. Pat. No. 3,988,043). Thus, the braking pressure in the high wheel can be controlled by the pressure in the low wheel which is being regulated by the ABS, or else the braking pressure in the high wheel is kept at a constant value and so a mean brake pressure difference ($\Delta P$) is maintained.

It is a disadvantage in these known arrangements that the reduction in yawing moment is constant, i.e., the reduction is not adapted to the different road conditions or the particular vehicle concerned. The maximum braking pressure at the high wheel after the time-delayed build-up depends only on the changes in the low wheel braking pressure as determined by the frictional force of the low wheel. As a result, the maximum braking pressure at the high wheel that would be permitted in maintaining control of vehicle behavior is not always utilized sufficiently. It is thus possible, in some instances, that stopping distance may be sacrificed due to insufficient braking of the high wheel in case of changing characteristics of the road surface.

Under certain circumstances, however, it is also possible that the braking pressure difference ($\Delta P$) may be too high for critical vehicles, so that they can be controlled only with difficulty or not at all by the driver.

The invention has as its object to provide a process for reducing the yawing moment in a vehicle equipped with an anti-lock brake system (ABS), relieving the driver on the one hand from excessive counter-steering, and on the other hand shortening the stopping distance by comparison with the known systems.

SUMMARY OF THE INVENTION

In accordance with the present invention, a process for reducing yaw during braking in a vehicle equipped with an anti-lock braking system (ABS) and traveling on a roadway having different coefficients of friction on opposite sides of the vehicle is disclosed. The process comprises regulating the braking pressures in the wheels of the vehicle during ABS-controlled braking so that a permissible braking pressure difference ($\Delta P$) between the braking pressure in a high wheel and the braking pressure in a low wheel is maintained. The permissible braking pressure difference ($\Delta P$) is calculated by an electronic system based on an algorithm that takes into account the frictional value of the road, and/or the load on the vehicle, and/or the wheel base of the vehicle, and/or the wheel gauge of the vehicle, and/or the level of the center-of-gravity of the vehicle. The algorithm used by the electronic systems to calculate the permissible braking pressure ($\Delta P$) increases the permissible braking pressure difference ($\Delta P$) as the frictional value of the road increases, the load of the vehicle, and the wheel base of the vehicle increase. Conversely, the algorithm decreases the permissible braking pressure difference ($\Delta P$) as the level of the center-of-gravity and the wheel gauge of the vehicle increase.

Through the application of the process according to the invention, an attenuation of yawing moment is achieved which automatically adapts to changing road conditions and vehicle types or loads, and thus contributes to the shortening of the overall stopping distance. At the same time, full control of the vehicle is preserved.

BRIEF DESCRIPTION OF THE DRAWINGS

The invention will now be explained in further detail with reference to the drawings, wherein.

DETAILED DESCRIPTION OF THE INVENTION

Figure 1:
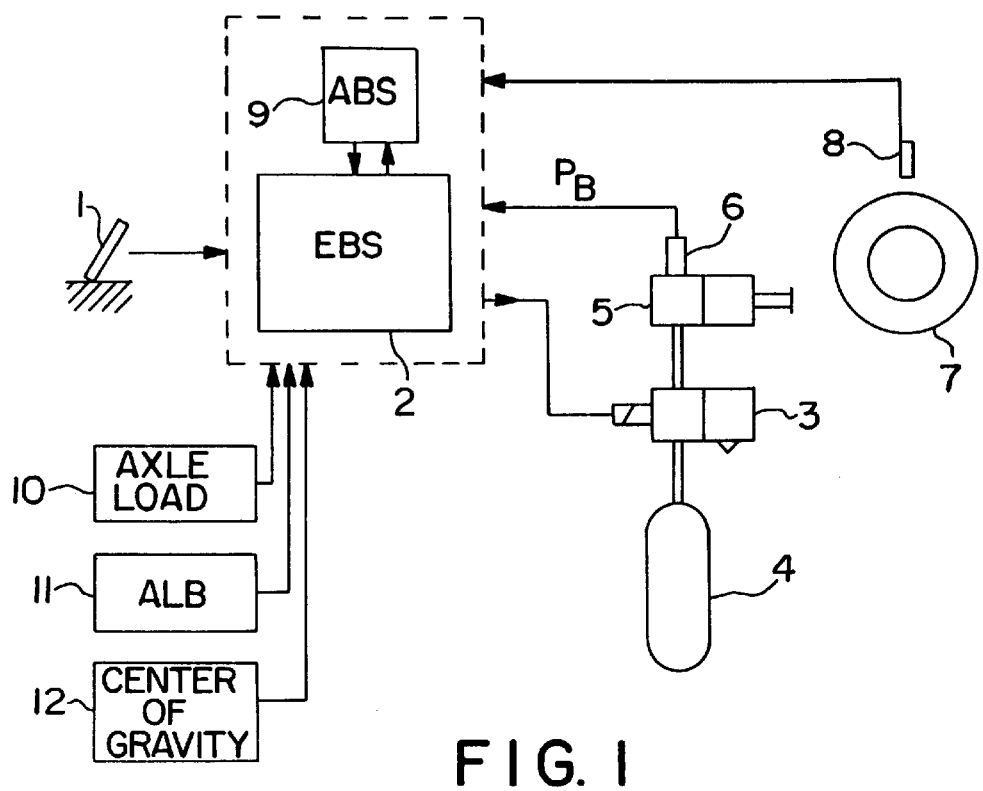
FIG. 1 is a schematic diagram of an electrically controlled brake system (EBS) having an integrated anti-lock brake system (ABS)

FIG. 1 schematically shows a braking system with electrical control (EBS) as a block diagram. A braking force transmitter (1) with electrical signal output is connected to a regulator (2) (EBS electronic system). The driver-desired braking pressure from the braking force transmitter (1) is compared in the regulator (2) with the actual braking pressure of the connected wheel which is measured by a pressure sensor (6) in brake cylinder (5). The actual braking pressure at each wheel is reported back to the regulator (2) as well as to the ABS electronic system (9) as braking pressure ($P_B$). The pressure sensor (6) can also be located in control valve (3).

Deviations between the desired braking pressure and the actual braking pressure are compensated for by means of the control valve (3) actuated by the regulator (2). Control valve (3) is connected to compressed air source (4). It is possible to set the pressure in the brake cylinder (5) to any desired value from zero up to the container pressure in the compressed air source (4) by means of the above-mentioned, constantly functioning, control valve (3).

The vehicle wheel (7) associated with the brake cylinder (5) is equipped with a rotational-speed sensor (8). The latter is connected to ABS electronic system (9). The two electronic systems (2) and (9) exchange data via the illustrated connection lines. Alternatively, the ABS may be integrated as a component or module in the EBS.

If the ABS electronic system (9) detects that locking of the vehicle wheel (7) is imminent, it transmits the appropriate signals to the regulator (2), causing it to lower the excessively high braking pressure. As a result, the wheel is relieved of braking pressure and is given the possibility to rotate once again. As soon as the rotational speed of the wheel (7) has adjusted itself to correspond with the speed of the vehicle, the wheel can again be subjected to braking pressure. This results in pressure regulating cycles with a frequency of approximately 1 Hz on the average.

One or more axle load sensors (10) are connected to the electronic systems of the regulator (2) or ABS electronic system (9) so that the electronic systems receive information about the vehicle load. In addition, an automatic load-dependent brake (11) is connected to the electronic systems and transmits signals to the electronic systems concerning the vehicle load.

A center-of-gravity unit (12) provides information on the level of the center-of-gravity of the vehicle to the electronic systems. The unit (12) can be a potentiometer or a keyboard by means of which the driver can enter an estimation on the level of the center-of-gravity of the vehicle. In the alternative, the unit (12) may be an electronic system which determines the center-of-gravity automatically, e.g., from the axle-load displacement during braking.

Figure 2:
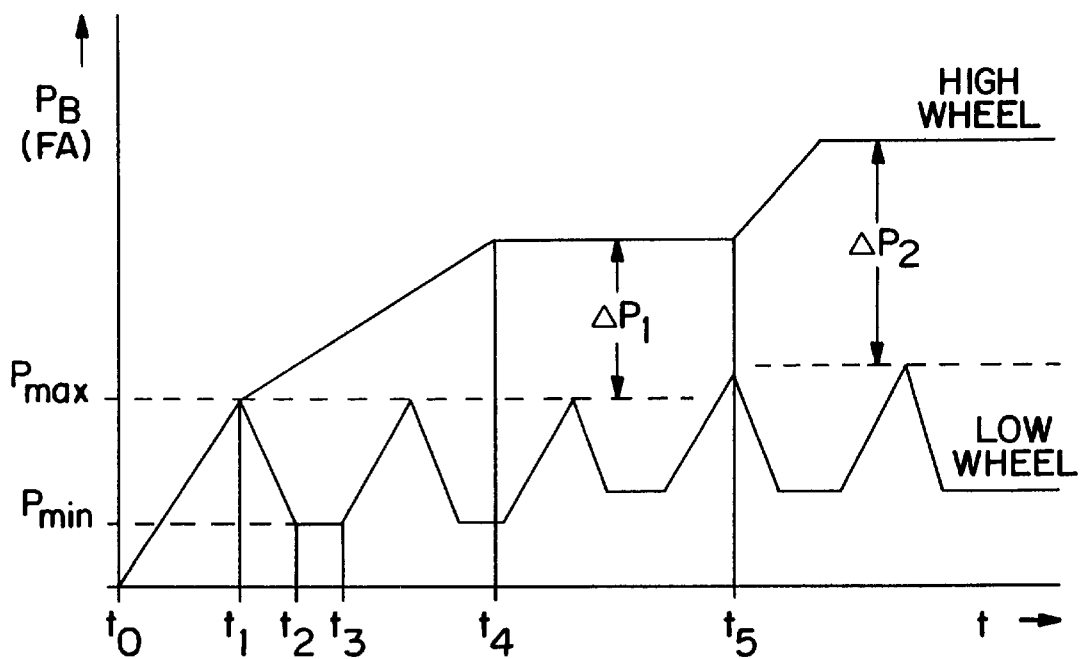
FIG. 2 is a diagram showing the course over a period of time (t) of the braking pressures ($P_B$) in the low wheel and the high wheel mounted on the steering axle of a vehicle.

FIG. 2 shows a diagram in which the braking pressures ($P_B$) of the wheels mounted on the steering or front axle (FA) of a vehicle are recorded over a period of time (t) in accordance with one embodiment of the invention. As can be seen, the braking pressures ($P_B$) for both wheels, i.e., for the high wheel running on the gripping side of the road and for the low wheel running on the smooth side of the road, increase initially at the same rate from the moment ($t_0$), the beginning of braking action.

At the point in time ($t_1$), the ABS electronic system (9) recognizes a tendency of the low wheel to lock up and causes a lowering of the braking pressure in the brake cylinder of the low wheel, lasting until the point in time ($t_2$). The braking pressure at the point in time ($t_1$) is the so-called deregulating pressure ($P_{max}$) at which the ABS electronic system (9) begins to deregulate the braking pressure in the low wheel on the front axle. After time ($t_2$), there follows a pressure-maintaining phase for the low wheel, until a new regulating cycle begins at point in time ($t_3$) with a renewed rise in braking pressure until ($P_{max}$) is once again reached in the low wheel.

At the same time, the braking pressure of the high wheel continues to increase, until the point in time ($t_4$). At time ($t_4$), the EBS regulator (2) begins to operate in accordance with the present invention to keep the braking pressure of the high wheel constant thereby not further increasing the yawing tendency of the vehicle. This occurs as soon as a braking pressure difference ($\Delta P$) has been reached. The rise in braking pressure of the high-wheel can be time-delayed by suitable signals of the ABS (9) in order to slow down the build up of the yawing tendency at the beginning of a braking action ($t_1$ to $t_4$).

The braking pressure difference ($\Delta P$) shown in FIG. 2 is the difference between the braking pressure of the high wheel on the front axle and the ABS deregulating pressure ($P_{max}$) of the low wheel on the front axle. However, the braking pressure difference ($\Delta P$) can also be defined differently, i.e., as the difference between the braking pressure in the high wheel on the front axle and the mean braking pressure of the low wheel on the front axle, e.g., ($P_{max}$+$P_{min}$)/2 (where $P_{min}$=holding pressure), or as the difference between the braking pressure of the high wheel and the current braking pressure of the low wheel.

The braking pressure difference ($\Delta P$) is no longer a fixed constant, as was customary in the past, but, according to the invention, it is a calculated variable value which is dependent on certain outside parameters so that the road conditions as well as certain parameters of the vehicle, such as the level of the center-of-gravity of the vehicle and the vehicle load are taken into account in order to reduce the yawing moment.

The admissible pressure difference ($\Delta P$) which is calculated by the ABS electronic system (9) or by the regulator (2) depends on the frictional value $\mu$ of the road. This calculation takes into account that the yawing moment can be more easily controlled or compensated for by counter-steering by the driver on a gripping road surface. In view of the foregoing, the algorithm used in calculating the admissible braking pressure difference ($\Delta P$) when the vehicle is driven on a gripping road surface can be designed so that a greater pressure difference ($\Delta P$) is permitted when the vehicle is driven on a gripping road surface than on a smooth road surface. The road frictional value $\mu$ is determined qualitatively by means of a suitable process from the actual deregulating pressures $P_{max}$.

As can be seen in FIG. 2, the deregulating pressure ($P_{max}$) increases from point $t_5$ on, which reflects an improvement in the road conditions. Accordingly, the admissible pressure difference $\Delta P$ is permitted to increase from $\Delta P_1$ to $\Delta P_2$ starting at $t_5$.

Another important quantity used to calculate the admissible pressure difference ($\Delta P$) is the level of the center-of-gravity of the vehicle. The level of the center-of-gravity depends to a great extent on the current load of the vehicle, especially when the vehicle is a utility vehicle. The level of the center-of-gravity of the vehicle is transmitted to the electronic systems by center-of-gravity unit (12).

Additional parameters, such as the wheel base and the wheel gauge of the vehicle can also be taken into account when calculating the admissible pressure difference ($\Delta P$) in order to attenuate the yawing moment of the vehicle.

The algorithm for calculating the admissible pressure difference ($\Delta P$) is selected so that $\Delta P$ is increased or decreased according to certain parameters involving the vehicle.

Thus, the admissible pressure difference ($\Delta P$) is increased as the frictional value of the road, the load of the vehicle, and the wheel base of the vehicle increase. The admissible pressure difference (ΔP) is increased to reflect increases in these parameters because it is known from both experience and theory that increases in these parameters lead to better control of the vehicle during times when yawing moments are produced.

On the other hand, the admissible pressure difference (ΔP), as calculated by the algorithm of the present invention, is decreased as the level of the center-of-gravity and the wheel gauge of the vehicle increase, since experience and theory show that increases in these parameters lead to less control of the vehicle when the vehicle is experiencing split $\mu$ situations.

The above mentioned frictional value $\mu$ of the road can be calculated by using the following formula:

$$\mu = c \times P_{max}/F_N$$

wherein $\mu$=frictional value of the road, c=constant, $P_{max}$=ABS deregulating pressure of a wheel on the rear axle, and $F_N$=load of a wheel on the rear axle.

The vehicle load is obtained from a signal from the ALB sensor (11) or from signals from the axle load sensors (10) located on the rear axle of the vehicle. The level of the center-of-gravity of the vehicle can be approximated by the driver and entered into the electronic systems EBS (2) or ABS (9) by means center-of-gravity unit (12), e.g., by means of a keyboard.

In the alternative, the level of the center-of-gravity of the vehicle may be calculated automatically without the driver's input by the center-of-gravity unit (12). The unit (12) may use signals from the axle load sensors (10) to calculate the level of the center-of-gravity of the vehicle based on variations in the road gradients and/or the acceleration of the vehicle. For this purpose, the extent of rocking movements of the vehicle which occur on road gradients, or during acceleration or deceleration of the vehicle, may be used since they are approximately proportional to the level of the center-of-gravity.

It may also be advantageous to input the length of the wheel base, the wheel gauge, and the empty weight of the vehicle into the regulator (2) or into the ABS electronic system (9) prior to start-up of the vehicle. This information may be stored in the regulator (2) or ABS electronic system (9) so that it can be utilized to calculate the admissible pressure difference (ΔP).

The above-described invention is of course applicable correspondingly also to vehicles having more than one steering axle or more than one rear axle. The invention can also be utilized in systems designed to attenuate the yawing moment where the pressure level in the high wheel is not increased step-wise, as shown in FIG. 2, but where the pressure level in the high wheel changes synchronously with pressure cycles in the low wheel.

While the invention has been described by reference to specific embodiments, this was for purposes of illustration only. Numerous alternative embodiments will be apparent to those skilled in the art and are considered to be within the scope of the invention.

It is claimed:

1. A process for reducing yaw during braking in a vehicle traveling on a roadway having different frictional values on opposite sides of said vehicle, said vehicle having a front axle and a rear axle on which wheels are mounted, said vehicle being equipped with an anti-lock braking system which operates to reduce braking pressure in any of said wheels during an ABS-controlled braking, said process comprising:

detecting said braking pressures in said wheels, calculating a permissible braking pressure difference (ΔP) between the braking pressure in a high wheel and the braking pressure in a low wheel, said high wheel traveling on a side of the roadway having a higher coefficient of friction than said low wheel, and adjusting said braking pressures in said high wheel so that said permissible braking pressure difference (ΔP) is maintained at a constant value, wherein said permissible braking pressure difference (ΔP) is calculated in an electronic unit by means of an algorithm which takes into account at least one of the frictional value of the roadway, the load on the vehicle, the wheel base of the vehicle, the wheel gauge of the vehicle, and the level of the center-of-gravity of the vehicle, wherein said algorithm increases said permissible braking pressure difference (ΔP) with increases of the frictional value of the roadway, the load on the vehicle, and the wheel base of the vehicle, and decreases said permissible braking pressure difference (ΔP) with increases in the level of the center-of-gravity of the vehicle and the wheel gauge of the vehicle.

2. The process of claim 1 wherein said frictional value of the roadway is calculated in accordance with the formula:

$$\mu = c \times P_{max}/F_N$$

wherein $\mu$=the frictional value of the roadway, c=a constant, $P_{max}$=an ABS deregulating pressure of a wheel on a rear axle of the vehicle, and $F_N$=the load of at least one wheel on the rear axle.

3. The process of claim 1 wherein said load of the vehicle is determined by said electronic unit from signals received from an automatic load-dependent brake sensor.

4. The process of claim 1 wherein said load of the vehicle is determined by said electronic unit from signals received from at least one axle load sensor.

5. The process of claim 1 wherein the level of the center-of-gravity of said vehicle is manually entered into said electronic unit.

6. The process of claim 1 wherein the level of the center-of-gravity is determined automatically by said electronic unit.

7. The process of claim 1 wherein the wheel base of the vehicle, the wheel gauge of the vehicle, and the empty weight of the vehicle are manually entered in said electronic unit prior to start-up of the vehicle.

* * * * *